US012709464B2

(12) United States Patent
McConnell et al.

(10) Patent No.: US 12,709,464 B2
(45) Date of Patent: Aug. 18, 2026

(54) WASTE DISPOSAL SYSTEM HAVING A SLIDER

(71) Applicant: 1316 LLC, Las Vegas, NV (US)

(72) Inventors: Thomas E. McConnell, Santa Ynez, CA (US); Yafei Lu, Pizhou City (CN); Qianqian Wang, Xuzhou City (CN)

(73) Assignee: 1316 LLC, Las Vegas, NV (US)

(*) Notice: Subject to any disclaimer, the term of this patent is extended or adjusted under 35 U.S.C. 154(b) by 8 days.

(21) Appl. No.: 19/047,621

(22) Filed: Feb. 6, 2025

(65) Prior Publication Data

US 2026/0225798 A1 Aug. 6, 2026

(51) Int. Cl.
*B65F 1/06* (2006.01)
*B65F 1/16* (2006.01)

(52) U.S. Cl.
CPC .............. *B65F 1/06* (2013.01); *B65F 1/1646* (2013.01); *B65F 2001/1653* (2013.01)

(58) Field of Classification Search
CPC .......... B65F 1/06; B65F 1/1646; B65F 1/065; B65F 1/062; B65F 1/067
USPC ..................................................... 220/495.08
See application file for complete search history.

(56) References Cited

U.S. PATENT DOCUMENTS

| | | | | | |
|---|---|---|---|---|---|
| 6,128,890 | A * | 10/2000 | Firth | B65F 1/1607 83/649 |
| 7,350,663 | B2 * | 4/2008 | Chomik | B65F 1/163 220/264 |
| 9,718,614 | B2 * | 8/2017 | Chomik | B65B 9/15 |
| 9,994,392 | B1 * | 6/2018 | Stravitz | B65B 67/125 |
| 10,081,489 | B2 * | 9/2018 | Morand | B65F 1/062 |
| 2017/0081116 | A1 * | 3/2017 | McConnell | B65F 1/1646 |
| 2025/0019157 | A1 * | 1/2025 | Yu | B65F 1/062 |
| 2025/0066115 | A1 * | 2/2025 | Johnson | B65F 1/06 |
| 2026/0028180 | A1 * | 1/2026 | Singleton | B65F 1/10 |

FOREIGN PATENT DOCUMENTS

| | | | | |
|---|---|---|---|---|
| CN | 114013874 A * | 2/2022 | B65F 1/14 |
| CN | 114620370 A * | 6/2022 | B65F 1/1638 |
| WO | WO-2015145579 A1 * | 10/2015 | B65F 1/06 |
| WO | WO-2018107179 A1 * | 6/2018 | B65F 1/0006 |

* cited by examiner

*Primary Examiner* — Orlando E Aviles
*Assistant Examiner* — Niki M Eloshway
(74) *Attorney, Agent, or Firm* — WPAT Law, P.C.; Anthony King

(57) ABSTRACT

A waste disposal pail having a slider that is capable of moving up and down vertically within a lid insert. The slider acts to pry open a passage of the waste bag/liner when tension is no longer applied to the neck region of the waste bag/liner. When a user begins to twist the neck region of the waste bag/liner closed, the closure of the waste bag/liner pushes the slider back up into its original position.

18 Claims, 11 Drawing Sheets

WASTE DISPOSAL SYSTEM HAVING A SLIDER

FIELD OF THE DISCLOSURE

The present disclosure relates to a waste disposal system, more particularly, a waste pail with a slider capable of spreading open a waste liner.

BACKGROUND OF THE DISCLOSURE

A waste pail is a garbage can for receiving and holding waste articles. There have been various efforts to design a waste pail to keep odor from escaping the waste pail. For example, the waste pail as disclosed in U.S. Pat. No. 11,858,733 B2, issued Jan. 2, 2024, which is incorporated herein by reference in its entirety.

These known designs, however, may not properly keep the waste liner sufficiently open to allow a lightweight item, such as a tissue paper or a newborn diaper to drop into the waste liner.

There is a continuing need for new ways to sufficiently open a waste liner so that light-weight waste articles may drop into the waste pail while still allowing the waste liner to close completely.

All referenced patents, applications and literature are incorporated herein by reference in their entireties. Furthermore, where a definition or use of a term in a reference, which is incorporated by reference herein, is inconsistent or contrary to the definition of that term provided herein, the definition of that term provided herein applies and the definition of that term in the reference does not apply. Although the present embodiments may obviate one or more of the above-mentioned needs, some aspects of the embodiments might not necessarily obviate them.

BRIEF SUMMARY OF THE DISCLOSURE

In a general implementation, the contemplated waste disposal pail can have a bottom drum and a top drum. The bottom drum holds a waste bag/liner while the top drum includes a lid casing and a mechanism to control a rotational movement of a collar which is placed over the top opening of the bottom drum.

In one implementation, the top drum can include a lid casing and a manual actuator. The manual actuator can be located on the top side of the lid casing to directly or indirectly control the rotational movement of the collar. The manual actuator can have a vertical movement (e.g., push button) or a rotational movement (e.g., a turn knob or turn dial). In addition to, or alternatively, a foot pedal actuator can be used to control the rotational movement of the collar.

The manual actuator can either directly or indirectly cause a rotator to rotate. The rotator can also be disposed within the lid casing or under the lid casing to make direct or indirect engagement with the collar. There can also be at least two gears disposed within the lid casing to transfer motion and power between the manual actuator and the rotator. The optional gears can also be of different sizes to provide a mechanical advantage which allows for an improved speed and/or torque of the rotator. It should be noted that the gears are entirely optional. In other embodiments, there are no gears at all.

In another aspect combinable with the general implementation, there can be a lid insert placed on top of the bottom drum. The lid insert has a center opening through which waste items pass through before entering the waste liner below.

In another aspect combinable with the general implementation, there can be a slider slidingly engaged with the lid insert. More specifically, the slider can nestle within the lid insert and can slide in a vertical direction up and down. The slider can have a bottom-most portion that makes abutting contact with the waste liner to spread open the waste liner.

In another aspect combinable with the general implementation, there can be a waste liner having a neck region that defines a passage through which the waste item passes through. When the neck region is twisted to apply a tension force to shut closed the passage, the closing of the neck region in effect causes the neck region of the waste liner to abuttingly push the slider upward, thereby sliding back into the lid insert.

In another aspect combinable with the general implementation, the neck region of the waste liner can be untwisted to release a tightening tension, at the same time allowing the slider to slide vertically downward by gravity into the passage of the waste liner, thereby forcibly spreading and/or keeping the passage open so that a lightweight waste item can freely drop through the passage of the waste liner.

In another aspect combinable with the general implementation, the slider moves downward by gravity only.

In another aspect combinable with the general implementation, the slider can be mechanically and/or electrically driven by an actuator, e.g., a small motor, to move vertically downward.

In another aspect combinable with the general implementation, the lid insert has an interior wall and there can be a detent disposed somewhere on the interior wall of the lid insert. The detent stops the slider from moving further downward.

In another aspect combinable with the general implementation, the slider can have a dam that makes abutting contact with the detent on the lid insert to stop the slider from moving further downward vertically.

In another aspect combinable with the general implementation, the dam can be located directly below the upper rim of the slider, or as part of the upper rim, or the dam can be located anywhere lower than the upper rim.

In another aspect combinable with the general implementation, the slider can have a cylindrical body where its bottom-most portion forms a circular rim.

In another aspect combinable with the general implementation, the bottom-most portion of the slider can have a bevel or chamfer surface.

In another aspect combinable with the general implementation, the slider can have a bottom-most portion being a circular ring structure connected to the upper rim of the slider by at least one support.

In another aspect combinable with the general implementation, the slider can be comprised of a plurality of downwardly extending panels each having a distal end, and these distal ends can each have an arc shape.

In another aspect combinable with the general implementation, the slider can be an upper rim with a plurality of curved support, such as curved wires made of plastic, metal, or any rigid material.

The details of one or more implementations of the subject matter described in this disclosure are set forth in the accompanying drawings and the description below. Other features, aspects, and advantages of the subject matter will become apparent from the description, the drawings, and the claims. Certain features that are described in this specification in the context of separate implementations can also be implemented in combination in a single implementation. Conversely, various features that are described in the context of a single implementation can also be implemented in multiple implementations separately or in any suitable sub-combination.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
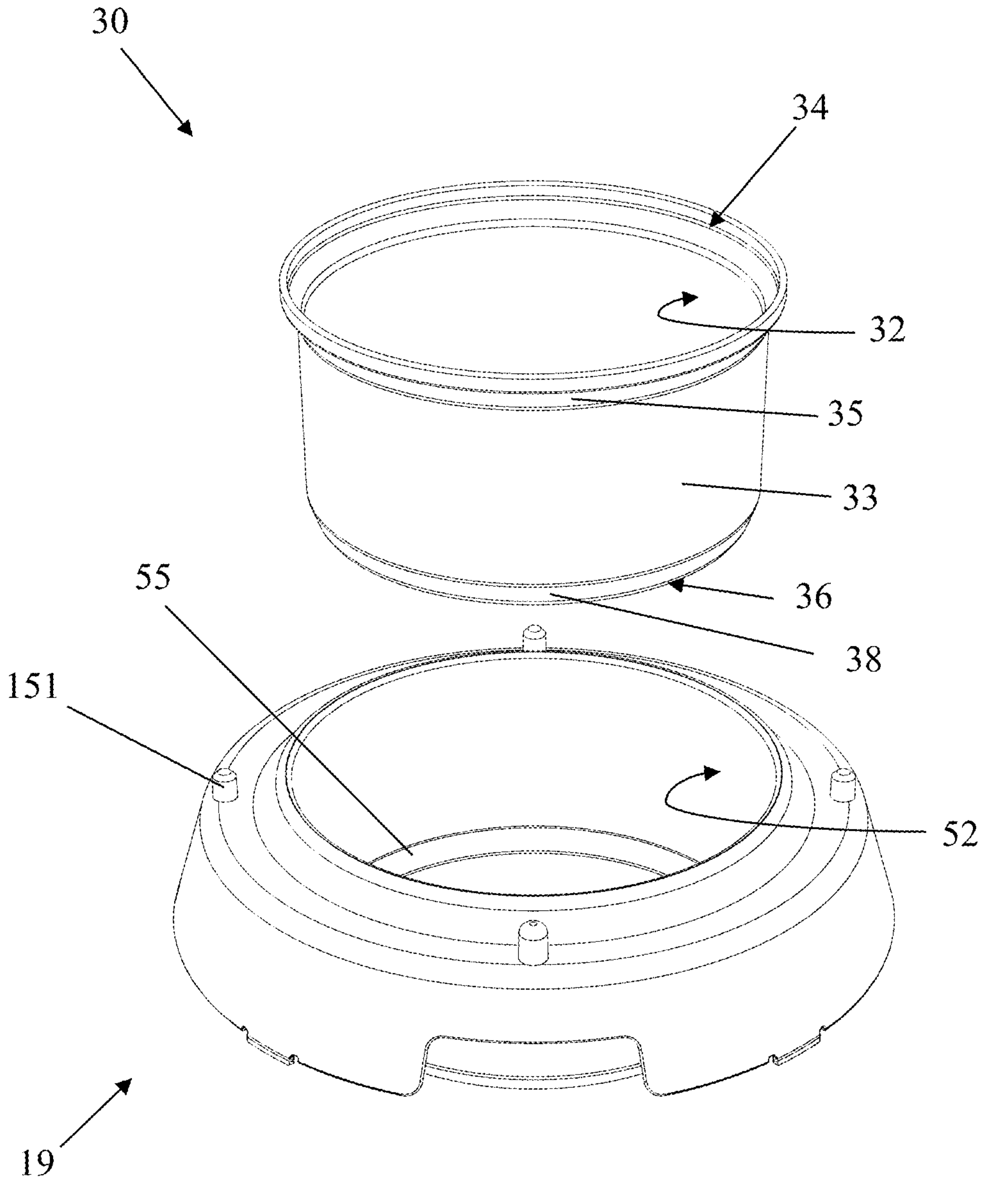
FIG. 1 is a perspective view of an embodiment of a contemplated lid insert and slider combination according to an aspect of the embodiment.

The following call-out list of elements in the drawing can be a useful guide when referencing the elements of the drawing figures:

1 Waste Disposal Pail
2 Top Drum
3 Bottom Drum
4 Upper Portion
5 Lower Portion
10 Waste Bag/Liner
11 Passage
18 Tether
19 Lid Insert
20 Attachment Point
30 Slider
32 Interior Side of the Wall of the Slider
33 Exterior Side of the Wall
34 Upper Rim
35 Dam
36 Bottom Rim
38 Bevel
52 Interior Wall of the Lid Insert
55 Detent
101 Lid Casing
104 Pivoting Rod
105 Turn Knob
109 Outer Hinge
121 Inner Collar
122 Outer Collar
125 Inner Hinge
151 Protuberance
230 Slider
231 Support
234 Upper Rim
235 Dam
236 Bottom Rim
238 Bevel/Bottom-most portion
330 Slider
331 Panel
332 Interior Side of the Panel of the Slider
333 Exterior Side of Panel
334 Upper Rim
335 Dam
336 Bottom-Most Portion
430 Slider
431 Support
434 Upper Rim
435 Dam
436 Bottom-Most Portion

DETAILED DESCRIPTION

The different aspects of the various embodiments can now be better understood by turning to the following detailed description of the embodiments, which are presented as illustrated examples of the invention as defined in the claims. It is expressly understood that the embodiments as defined by the claims may be broader than the illustrated embodiments described below.

Basic Components

The contemplated waste disposal pail 1 can receive and store various types of waste articles, including very light-weight items such as tissue papers and newborn infant diapers. This waste disposal pail 1 can also receive and store used cat litter, dog waste, adult soiled diapers, and more.

Figure 11:
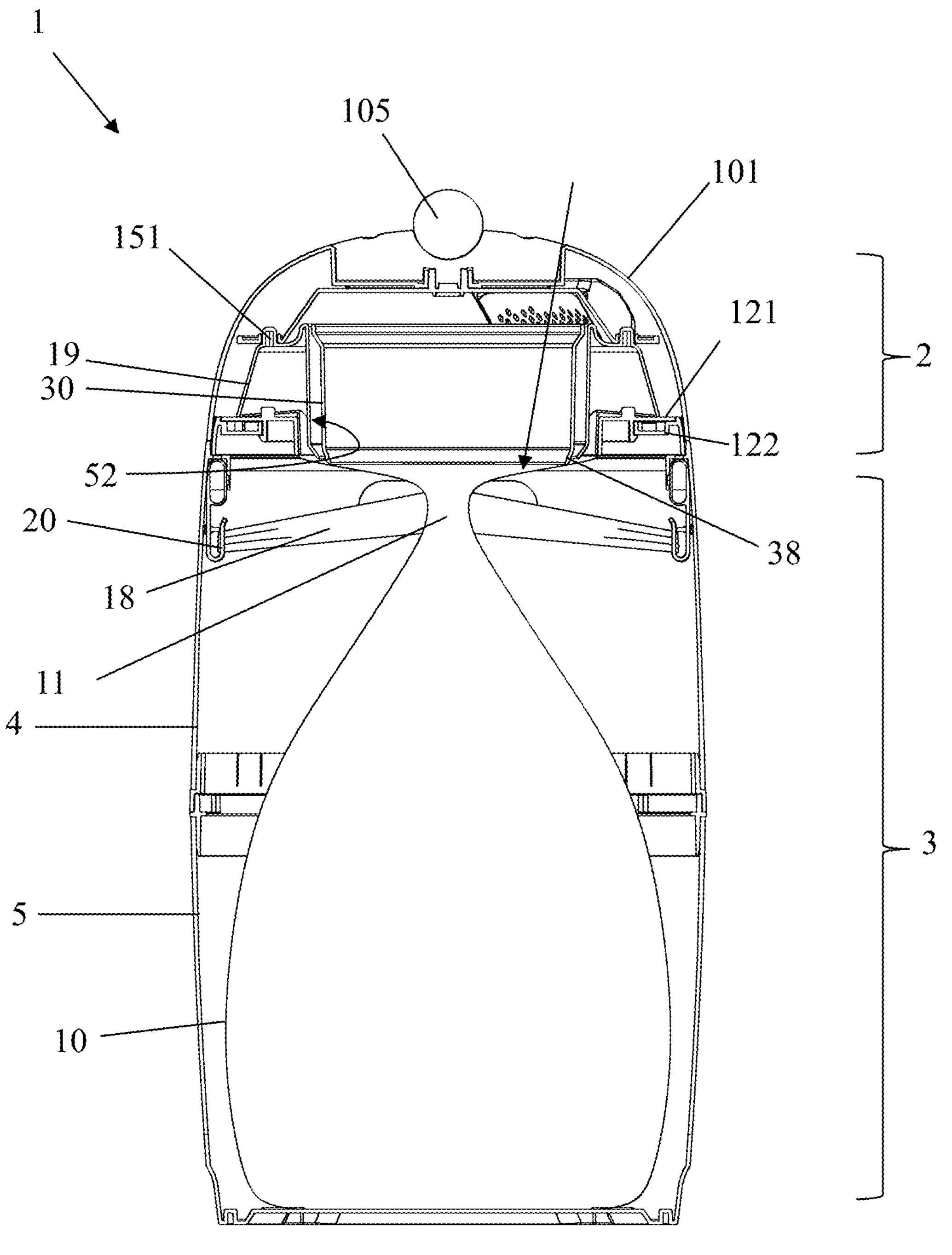
FIG. 11 is a cross-sectional view of the contemplated waste pail of FIG. 9 with a waste liner installed, showing two tethers wrapped around the neck of the waste liner to twist shut the passage, and the twisted neck region kept the slider in a upper position being nestled in the lid insert, according to an aspect of the disclosure.

Referring first to FIG. 11, the basic components of the contemplated waste disposal pail 1 can include a top drum 2 to fit over a bottom drum 3. The top drum 2 can have a lid casing 101 that encloses various components, all of which will be described in more detail below. In the embodiment shown in FIGS. 7-13, there is a turn knob 105 at the top of the lid casing 101. The turn knob 105 is shown in the figures in a folded down position to make it flush to the surface of the lid casing 101. During use, a user would pivot the turn knob 105 up so he/she can hold the ball structure to turn/rotate the turn knob 105.

The bottom drum 3 can be a barrel shaped container with an empty enclosure within which a waste bag/liner 10 can be enclosed. The waste bag/liner 10 will be described in more detail below.

The bottom drum 3 can come in two or more separable pieces. Here, bottom drum 3 has an upper portion 4 detachably attached to a lower portion 5. Upper portion 4 may connect to the lower portion 5 using any known mechanical means. The upper portion 4 may clip onto the lower portion 5, or they may twist/screw onto each other. There can also be fasteners (not shown) to detachably attach the two pieces together. In another embodiment, the bottom drum 3 can be of a single-piece construction where the upper portion 4 and the lower portion 5 are of a single-piece drum (not shown).

Collar

Figure 8:
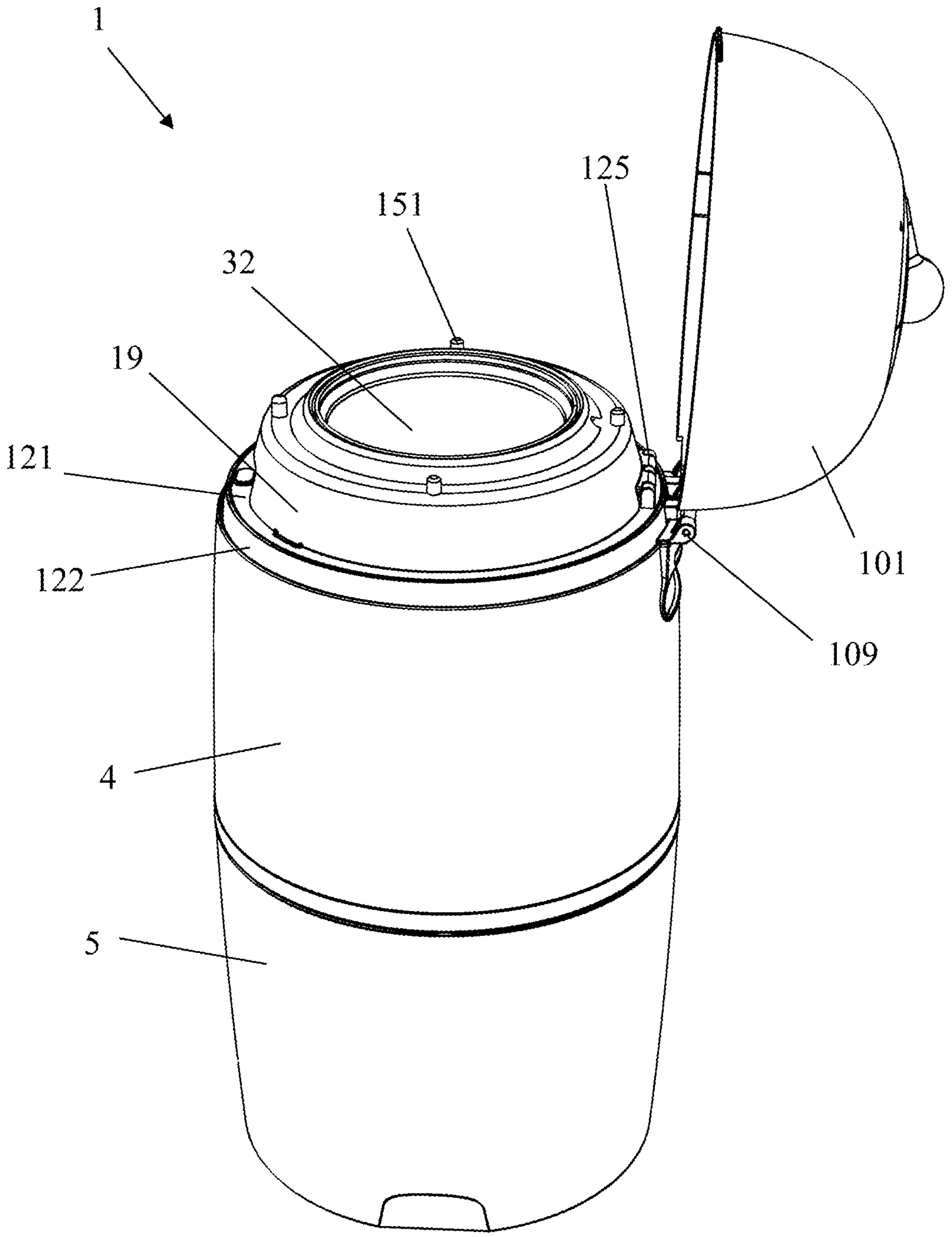
FIG. 8 is a perspective view of the contemplated waste pail with the lid insert and slider combination of FIG. 1 already installed onto the bottom drum, according to an aspect of the disclosure.

Referring now to FIG. 8, the lid casing 101 can be pivotably attached to the upper portion 4 of the bottom drum 2 via an outer hinge 109. A user can manually lift the lid casing 101 to reveal what is underneath the lid casing 101.

Directly disposed on top of the upper portion 4 of the bottom drum 3 is a lid insert 19. Lid insert 19 can have a generally funnel-shape to guide an entry of waste articles down into the waste bag/liner 10.

Lid insert 19 can be pivotably attached to an inner collar 121 via the inner hinge 125. In this way, a user can manually lift the lid insert 19 thereby revealing the inner collar 121 to which the waste bag/liner 10 can be attached.

Contemplated lid insert 19 can be a hollow structure having protuberances 151 disposed along its top side. These protuberances 151 can couple to certain corresponding catchers of a rotator (this is fully described in U.S. Pat. No. 11,858,733 B2, which is incorporated herein by reference in its entirety). The lid insert 19 is coupled to the inner collar 121 via an inner hinge 125. When the lid insert 19 rotates, the inner collar 121 also rotates together with the lid insert 19.

Figure 9:
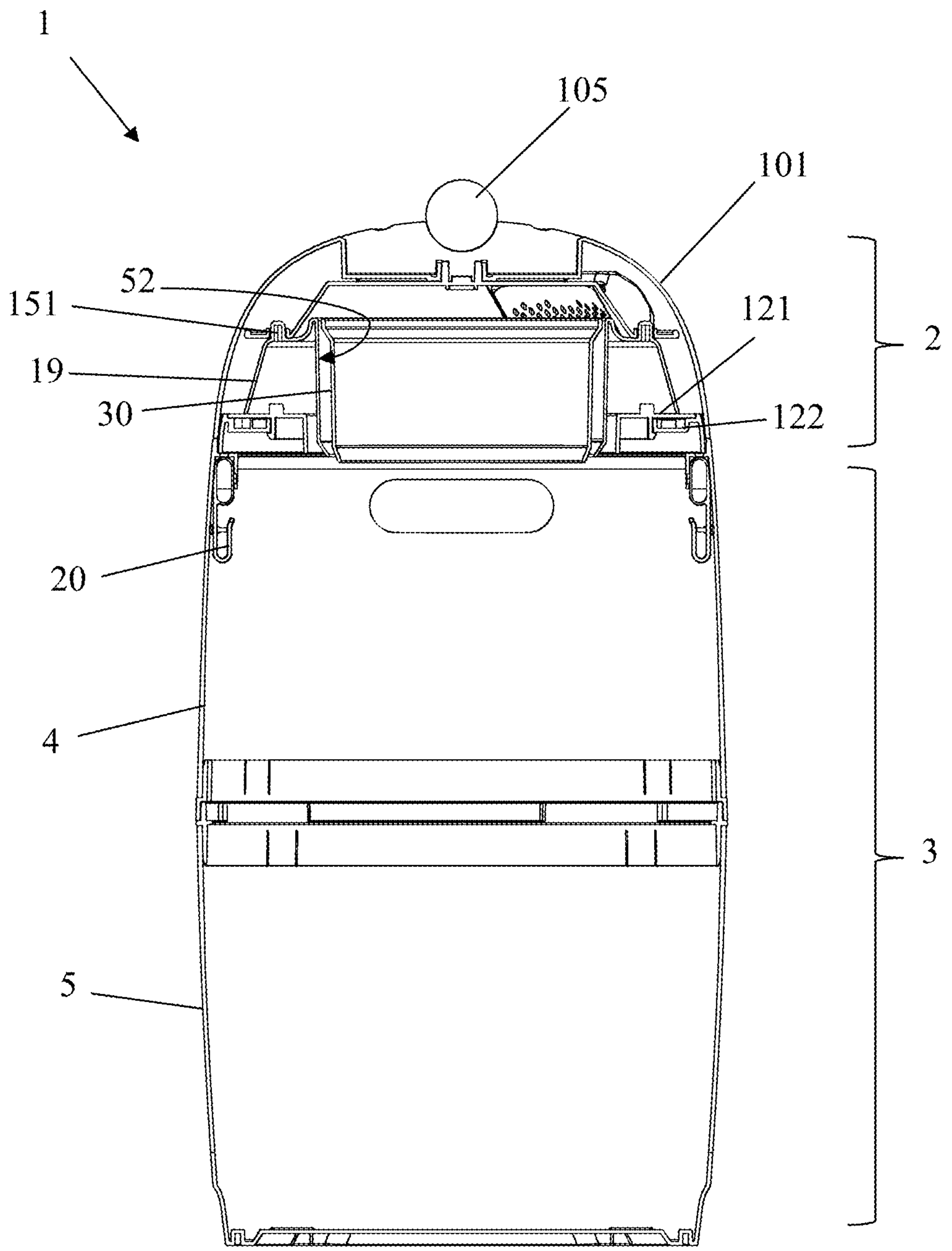
FIG. 9 is a cross-sectional view of the contemplated waste pail of FIG. 8 except with the top lid fully closed, according to an aspect of the disclosure.
Figure 10:
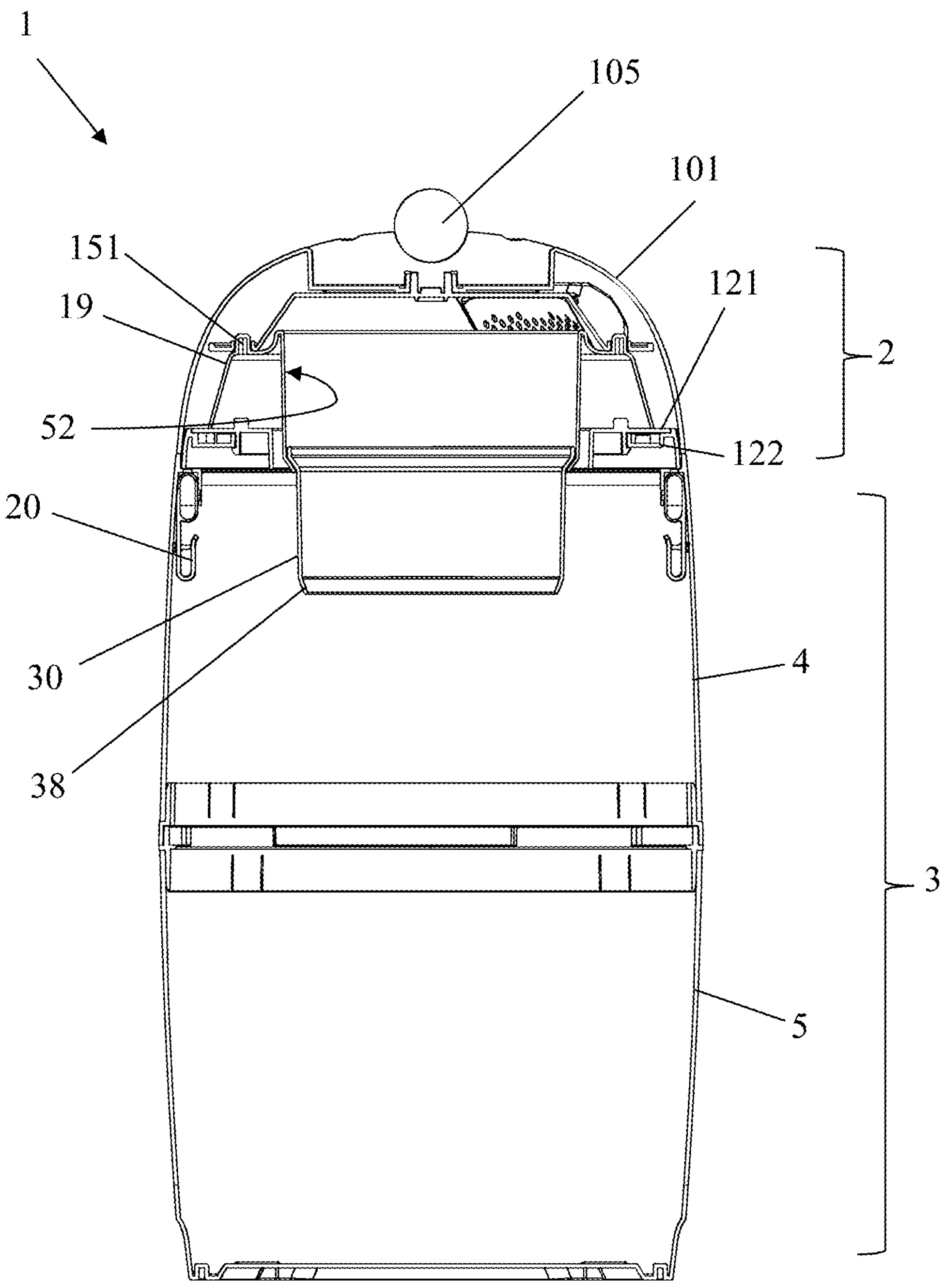
FIG. 10 is a cross-sectional view of the contemplated waste pail of FIG. 9 except with the slider dropped to its lowest position, according to an aspect of the disclosure.

In FIG. 9, Inner collar 121 fits over the outer collar 122 in a track and groove mechanism such that the inner collar 121 can freely rotate relative to a stationary outer collar 122. The outer collar 122 is fastened (e.g., by friction, screw blade, clip, etc.) to the upper portion 4 of the bottom drum 3. The outer collar 122 can also be pivotably coupled to the upper portion 4 of the bottom drum 3 via the outer hinge 109. In this way, a user may pivot open (i.e., tilt back) the inner collar 121 and outer collar 122 together, thereby providing easy access to the interior of the bottom drum 3.

In operation, the outer collar 122 remains stationary while the inner collar 121 can rotate along with the lid insert 19.

Waste Bag/Liner

Figure 12:
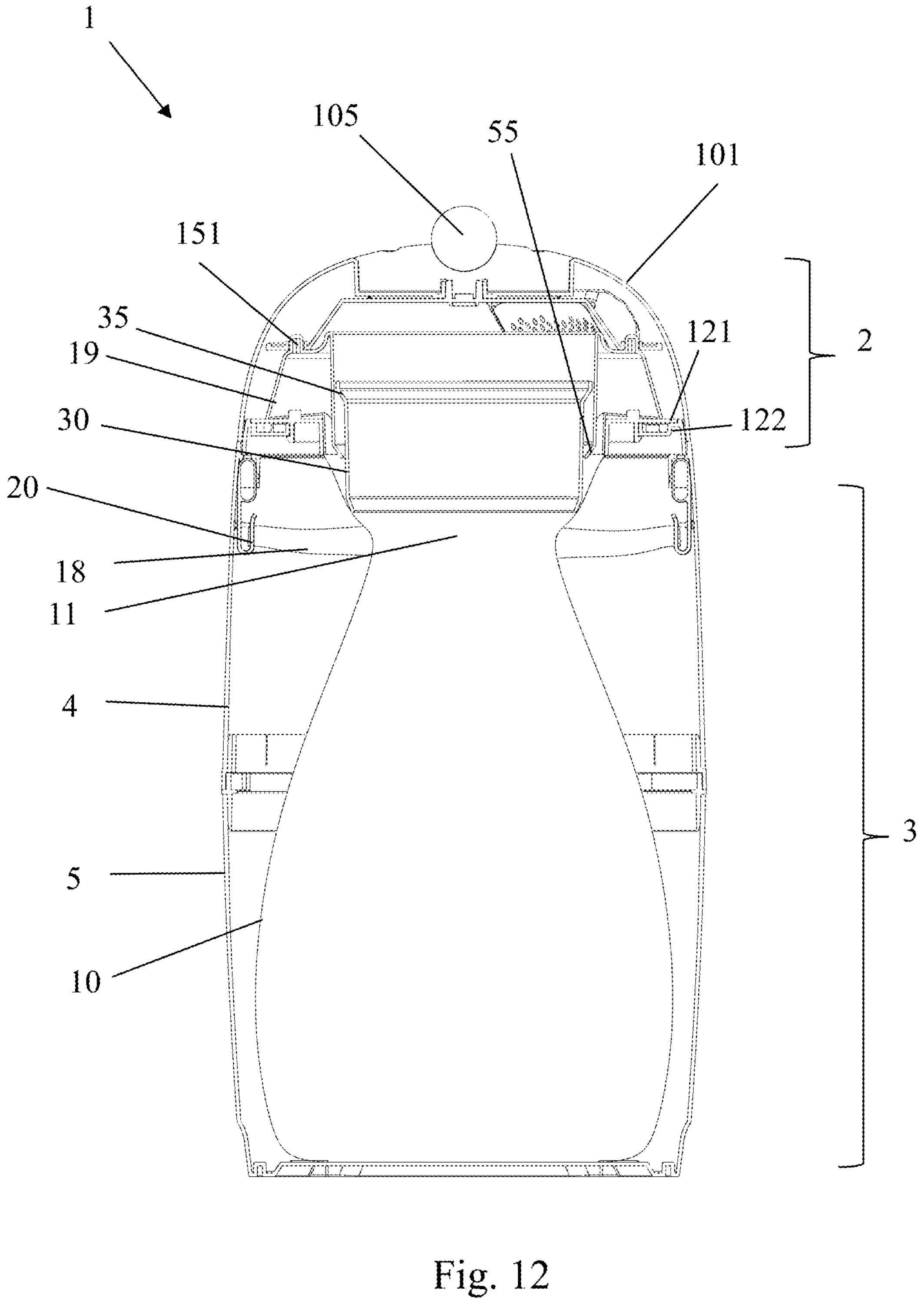
FIG. 12 is a cross-sectional view of the contemplated waste pail of FIG. 9, showing the two tethers no longer tightly wrapped around the neck of the waste liner thereby allowing the slider to drop down to pry open the passage of the neck region, according to an aspect of the disclosure.

Referring now to FIGS. 11 and 12, a waste bag/liner 10 can be provided in the bottom drum 3. The top rim of the waste bag/liner 10 can have a retaining feature so that the top rim of the waste bag/liner 10 can be secured to the inner collar 121 (this is fully described in U.S. Pat. No. 11,858,733 B2, which is incorporated herein by reference in its entirety).

In a general view of its operation, after the waste bag/liner 10 is newly installed, a passage 11 of the waste bag/liner 10 should be twisted shut (i.e., priming). In the embodiment shown in the figures, the user can manually do this by holding the lid insert 19 by hand and turn it in a twisting direction, followed by closing the lid casing 101. When a user needs to throw a waste article into the waste disposal pail 1, the user would first lift open the lid casing 101 to throw the waste article into the lid insert 19. The waste article would at this point stay on top of the twisted neck portion (the passage 11 is shut closed) of the waste bag/liner 10. Then, the user would manually close the lid casing 101. After the lid casing 101 is closed, the user would next operate the turn knob 105 which in turn rotates the lid insert 19 and inner collar 121 in an untwisting direction thereby untwisting the passage 11 of the waste bag/liner 10 thereby allowing the waste article to drop down into the waste bag/liner 10. The user would next operate the turn knob 105 in the opposite rotational direction (i.e., twisting direction) until the turn knob 105 returns to the home position.

The waste bag/liner 10 can have tethers 18 already attached to a region near the neck, above the neck, or below the neck of the waste bag 10. In other words, these are specialty waste bags/liners 10 made at the manufacturer with tethers 18 attached. During installation of the waste bag 10 into the bottom drum 3, a user can attach a free end of each tether 18 to its corresponding attachment point 20 (see FIG. 11). These attachment points 20 can be located on the inside wall of the bottom drum 3. The attachment points 20 can be of different mechanical structures than the hooks that are shown in FIGS. 11 and 12. For example, it can be a clip or a notch, etc. The twisting and all related components are fully described in U.S. Pat. No. 11,858,733 B2, which is incorporated herein by reference in its entirety.

Lid Insert/Slider

As mentioned above, the passage 11 of a primed waste bag/liner 10 remains twisted shut until a user is ready to drop a waste article down into it. A user can untwist the passage 11 open by the workings of certain mechanisms within the lid casing 101 as previously described in U.S. Pat. No. 11,858,733 B2, which is incorporated herein by reference in its entirety.

As described above, when a user needs to dispose of a waste article, the user would manually lift the lid casing 101 open to drop the waste article into the lid insert 19. At this point, the waste bag/liner 10 is in a primed position, with its passage 11 twisted shut by the tethers 18, as illustrated in FIG. 11. The user would next close the lid casing 101 while the waste article is still held within the wall of the lid insert 19 and resting above the closed passage 11. When the lid casing 101 is closed, the user may next manually operate an actuator such as a turn knob 105 to cause a rotator (not shown) to rotate in an untwisting direction opposite to the priming direction. When the rotator rotates in an untwisting direction, the lid insert 19, the inner collar 121, and the top rim of the waste bag/liner 10 all move in the same untwisting direction, thereby causing the passage 11 to open. Typically, the waste article would easily fall through the passage 11 by gravity. The user would then manually turn the turn knob 105 in the opposite direction (i.e., twisting direction) to twist the passage 11 shut again. In other embodiments previously described in U.S. Pat. No. 11,858,733 B2, the twisting can be automatically applied using springs, obviating the need to manually twist the passage 11 shut.

While most soiled diapers are heavy enough to fall through the untwisted passage 11, when the waste article is a very lightweight item such as a tissue paper, a wet wipe or a newborn infant diaper, it may not have sufficient weight to drop through the passage 11 by gravity. This is because even though tension applied by the tethers 18 around the neck region of the waste bag/liner 10 has been released, the untwisted passage 11 may be in a somewhat loosely shut configuration such that a lightweight item would still be held in place by the loosely shut passage 11.

The inventor has discovered a novel way to force the somewhat loosely shut passage 11 to open when the tethers 18 have released its tension around the neck of the waste bag/liner 10. Referring now to FIG. 1, a slider 30 can be provided to nestle within the lid insert 19. In the embodiment shown in FIG. 1, the slider 30 has a generally cylindrical shape, or a tubular shape, having a wall. The wall has an interior side 32 and an exterior side 33. While the wall is shown here as a solid wall, there can be other embodiments where the wall is not a solid wall, e.g., meshed wall or a wall with window/openings.

The slider 30 has an upper rim 34 and a dam structure 35 directly below the upper rim 34. The upper rim 34 provides a circular opening through which a waste article may fall through. At the bottom end of the slider 30 is a bottom rim 36 that has a circular shape and defines a circular opening (not shown) through which the waste article may fall through. The bottom rim 36 can have a smaller diameter than the diameter of the wall, and a bevel surface 38 or a chamfer surface is provided between the exterior side 33 of the wall and the bottom rim. This bevel surface 38 is located at the bottom-most portion of the slider 30; the purpose and function of this bevel surface 38 will be described further below.

Alternatively, the dam 35 can be located elsewhere on the exterior side 33 of the wall instead of being directly below the upper rim 34. In another embodiment, the dam 35 can be located somewhere on the exterior side 33 of the wall in between the upper rim 34 and the bottom rim 36.

The slider 30 can freely move vertically within the lid insert 19 within a given range. The lid insert 19 has an interior wall 52, a plurality of protuberances 151, and a detent 55 located at the bottom end of the interior wall 52. The diameter of the detent 55 corresponds with the diameter of the dam 35 such that when the slider 30 moves vertically downward, e.g., when it drops down by gravity, its further movement can be limited by this detent 55 when the detent abuts against the dam 35 of the slider.

Alternatively, detent 55 can be located elsewhere besides being at the bottom end of the interior wall 52. In another embodiment, the detent 55 can be located higher than the bottom end of the interior wall 52.

Figure 2:
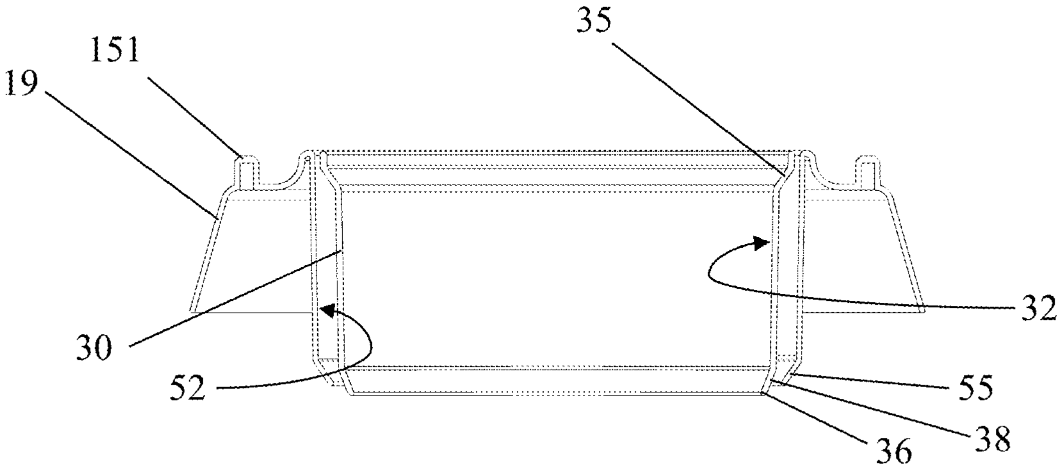
FIG. 2 is a cross-sectional view of the contemplated lid insert and slider combination of FIG. 1 with the slider nestled within the lid insert, according to an aspect of the disclosure.
Figure 3:
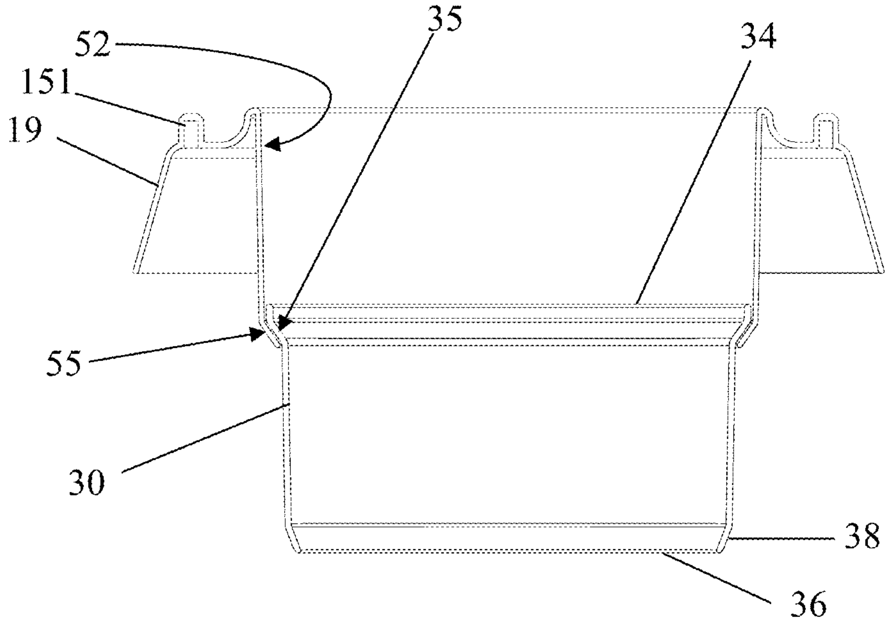
FIG. 3 is a cross-sectional view of the contemplated lid insert and slider combination of FIG. 1 with the slider lowered, according to an aspect of the disclosure.

FIGS. 2 and 3 illustrate the slider 30 and its spatial relationship with the lid insert 19. In this embodiment, both the slider 30 and the tubular channel formed by the interior wall 52 of the lid insert 19 are generally cylindrical with straight parallel sides and circular openings. It is particularly contemplated that other embodiments may alternatively use openings of other geometric shapes (not shown). It is also particularly contemplated that other embodiments of this invention may have a slider 30 and/or lid insert 19 that do not have straight parallel sides, such as conical sides, so long as the slider 30 can freely move vertically up and down relative to the lid insert 19.

In FIG. 3, the slider 30 has dropped to its lowest position and its dam 35 abuts against the detent 55 of the lid insert, thus preventing the slider 30 from further downward movement. Note that when an upward force is applied to the bottom rim 36 or the bevel surface 38, the slider 30 would freely move upwards. In other words, in both positions illustrated in FIGS. 2 and 3, the slider 30 is not mechanically locked into its vertical positions by the lid insert 19.

Figure 4:
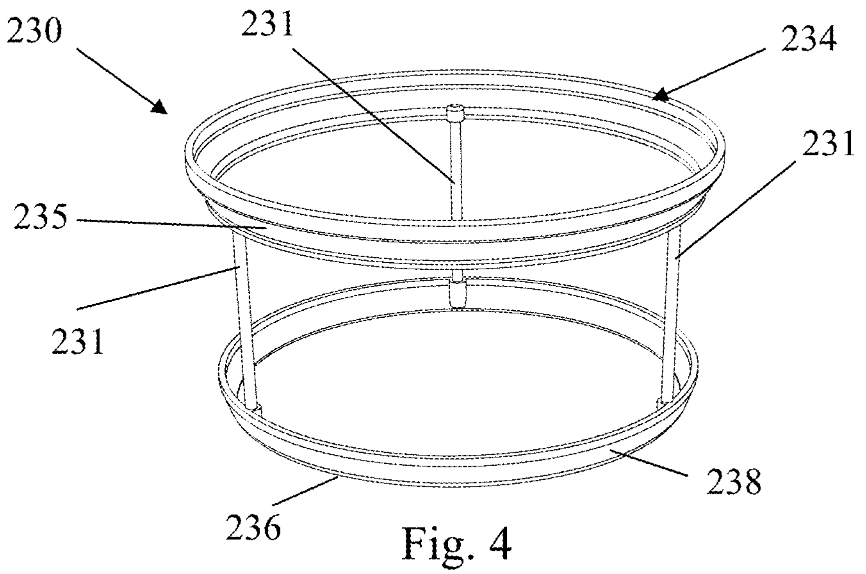
FIG. 4 is a perspective view of another contemplated embodiment of the slider, according to an aspect of the disclosure.

FIG. 4 illustrates another embodiment of slider 230. Here, slider 230 can have a top ring structure having an upper rim 234. Below the upper rim 236 is a dam 235 which has a decreasing diameter. The top ring structure has a circular shape defining an opening through which a waste article can fall through. The slider 230 can have a bottom ring structure having a bottom rim 236. The bottom ring structure defines an opening through which a waste article can fall through. On the bottom ring structure there is a bevel surface 238 similar to the bevel surface 38 of FIGS. 1-3. The top ring structure is connected to the bottom ring structure by at supports 231. While these supports 231 are shown to be vertically straight, other configurations are also contemplated. For example, these supports 231 can be at a slant.

Figure 5:
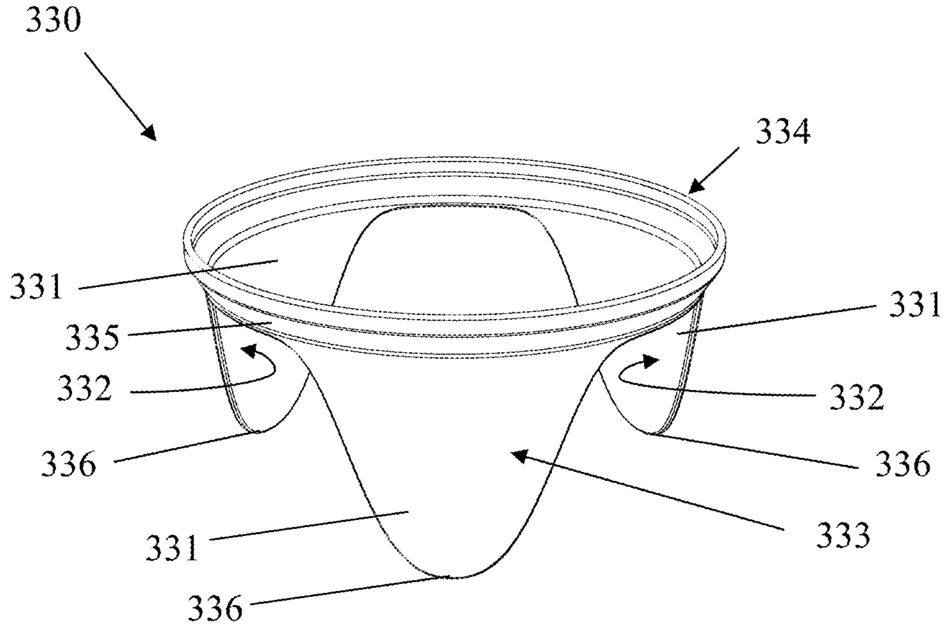
FIG. 5 is a perspective view of yet another contemplated embodiment of the slider, according to an aspect of the disclosure.

FIG. 5 illustrates yet another embodiment of slider 330. Here, slider 330 has a top ring structure with an upper rim 334 and a dam 335 located below the upper rim. Dam 335 has a decreasing diameter. A plurality of panels 331 is attached to the top ring structure. Each panel 331 has an interior side 332 and an exterior side 333. Each panel 331 can have a curved shape with a bottom-most portion 336. Although not shown, the bottom-most portion 336 can additionally include a bevel shape such as that shown in FIG. 4.

Figure 6:
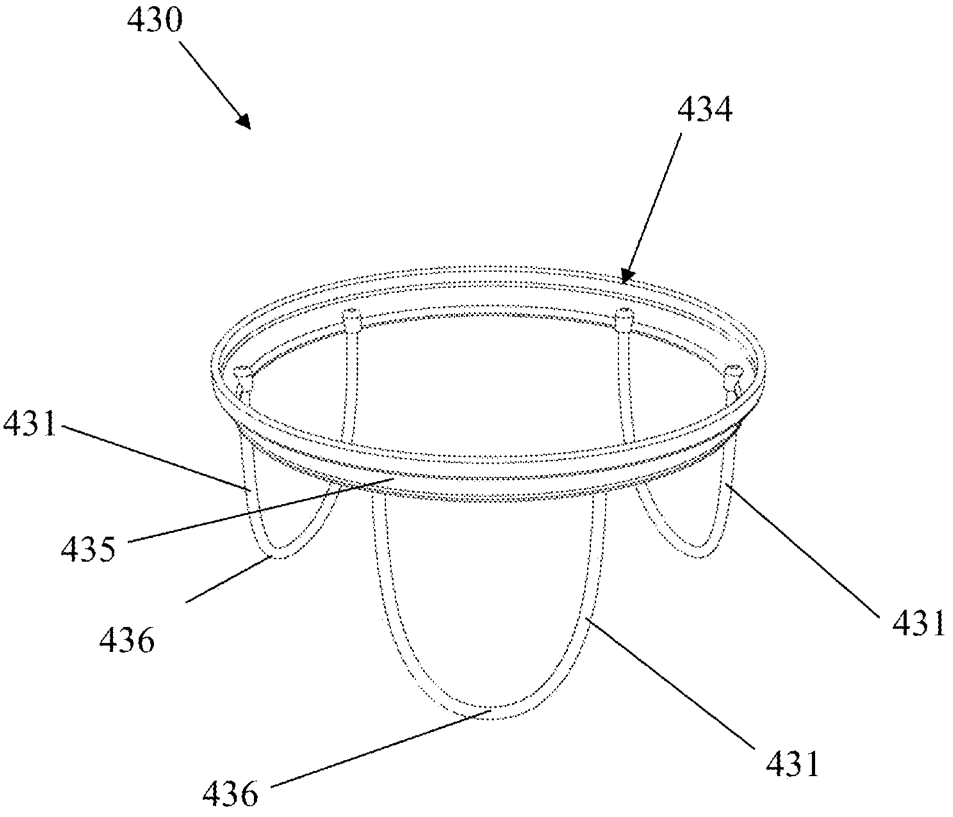
FIG. 6 is a perspective view of still another contemplated embodiment of the slider, according to an aspect of the disclosure.
Figure 7:
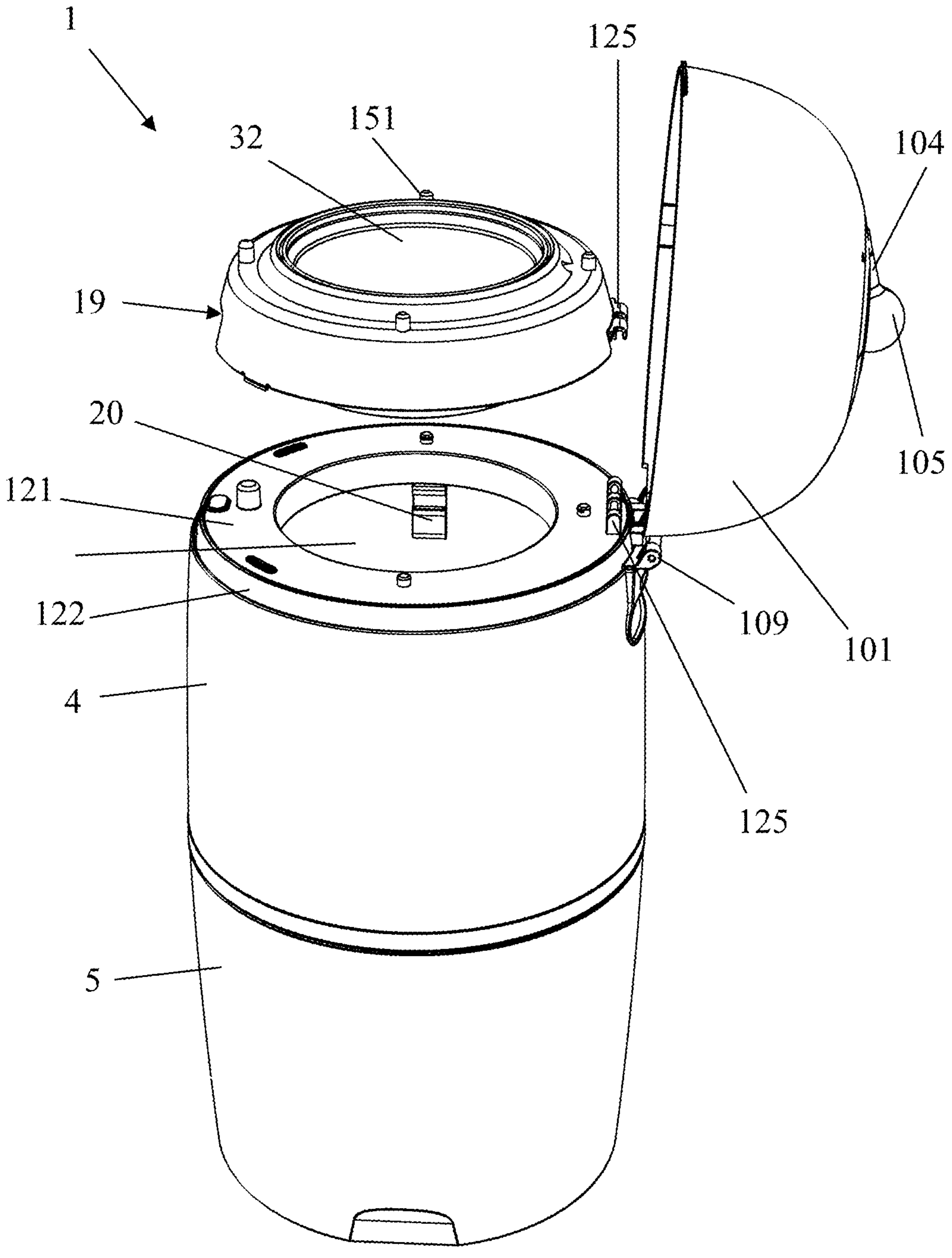
FIG. 7 is a perspective view of the contemplated waste pail of with the lid insert and slider combination of FIG. 1 yet to be installed onto the bottom drum, according to an aspect of the disclosure.

FIG. 6 illustrates still another embodiment of slider 430. Slider 430 can have an upper rim 434 and a plurality of curved supports 431 attached thereto. Each curved support 431 forms an arc with a bottom-most portion 436. The support 431 can be made with plastic or can be a metal wire.

Referring now to FIG. 11, this waste disposal pail 1 has a waste bag/liner 10 installed and the user has primed the waste bag/liner 10 so that its neck region is twisted shut, and passage 11 is closed. The neck region being twisted shut keeps the slider 30 in its first position, that is, nestled within the lid insert 19.

Figure 13:
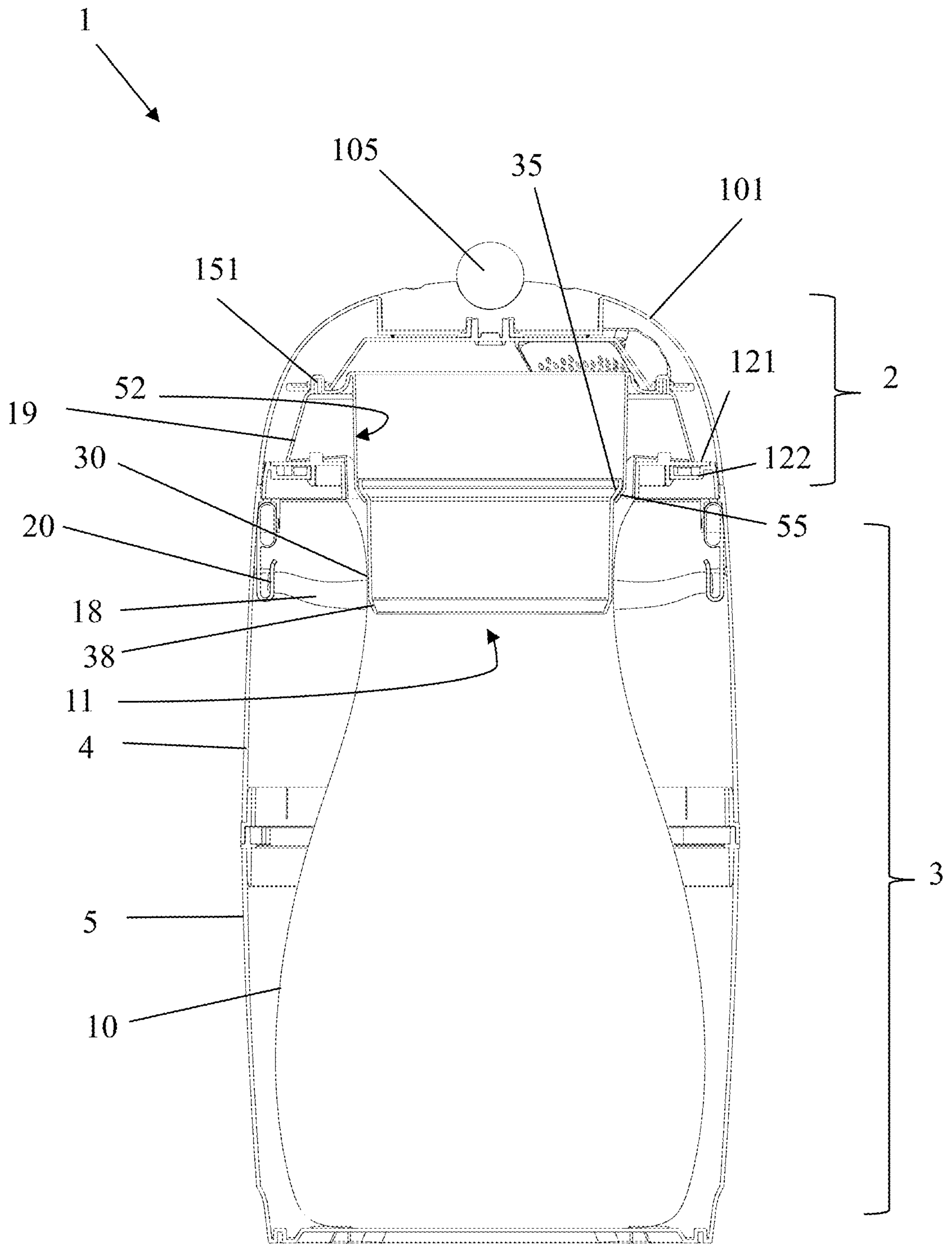
FIG. 13 is a is a cross-sectional view of the contemplated waste pail of FIG. 12, showing the slider having dropped fully towards the waste liner to pry open the passage of the neck region, according to an aspect of the disclosure.

In FIG. 12, a user has manually untwisted the neck region, and the tethers 18 have released their tension previously applied around the neck region. Now without the tension applied around the neck region, the weight of the slider 30 causes the slider 30 to freely drop downwards thereby prying open passage 11. In FIG. 13, the slider 30 has fully dropped down into its second position and is stopped from further movement by detent 55. The passage 11 is now sufficiently pried open and the lightweight item can now freely drop into the waste bag/liner 10.

When the user begins to twist the neck region of the waste bag/liner 10, tethers 18 begin to wrap around the neck region of the waste bag/liner 10, and the closing of the neck region abuts against the bevel surface 38 of the slider 30, causing the slider 30 to move upwards (see FIG. 12). When the neck region is completely twisted, the slider 30 is now back to its first position, nestled within the lid insert 19 (see FIG. 11).

The various embodiments of the slider 230, 330, 430 of FIGS. 4-6 function the same way. When the user begins to twist the neck region of the waste bag/liner 10, tethers 18 begin to wrap around the neck region of the waste bag/liner 10, and the closing of the neck region abuts against the bevel surface 238 of the slider 230 of FIG. 4, or in the embodiments of FIGS. 5 and 6, the closing the neck region abuts against the bottom-most regions 336, 436, causing the slider 230, 330, 430 to move upwards. When the neck region is completely twisted, the slider 230, 330, 430 is now back to its first position, nestled within the lid insert 19 (see FIG. 11).

While the sliders 30, 230, 330, 430 shown are designed to drop from a first position to a second position purely by gravity without being mechanically or electrically driven, it is especially contemplated that other embodiments may use a small motor or other known means to actively drive the sliders 30, 230, 330, and 430 between their first position and second position.

The contemplated combination of lid insert 19 and sliders 30, 230, 330, 430 can be readily interchanged with a regular lid insert as those described previously in U.S. Pat. No. 11,858,733 B2. A consumer can be provided with both the regular lid insert as well as the contemplated lid insert and sliders as described above so that the consumer can change out one for the other, based on their needs.

Many alterations and modifications may be made by those having ordinary skills in the art without departing from the spirit and scope of the disclosed embodiments. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of a waste disposal pail with a slider have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A waste disposal pail comprising:

a bottom drum to enclose a waste liner;

a lid insert disposed on top of the bottom drum;

a slider slidingly engaged with said lid insert to slide in a vertical direction between a first position and second position, said slider has a bottom-most portion to make abutting contact with the waste liner while said slider is moving from said first position to said second position;

wherein the waste liner has a neck region that defines a passage, and when said neck region is twisted thereby applies a tension force to shut closed said passage, said slider is at said first position and wherein said bottom-most portion of the slider remains disposed above said passage;

wherein when said neck region of the waste liner is untwisted to release said tension force, said slider moves vertically downward into said second position and into said passage of the waste liner to pry and/or keep said passage open;

wherein said first position is vertically higher than said second position.

2. The waste disposal pail as recited in claim 1, wherein when said slider moves vertically downward into said second position, said slider is not electrically driven and is not mechanically driven to move vertically downward; wherein said slider moves vertically downward into said second position by gravity, and said the bottom-most portion of said slider abuts against the waste liner to forcibly pry open said passage thereby allowing for a lightweight waste item to drop through the passage of the waste liner.

3. The waste disposal pail as recited in claim 1, wherein when the slider is in said second position, and when said neck region is twisted to apply said tension force to shut closed said passage, the waste liner abuts against the bottom-most portion of the slider thereby forcing said slider to move vertically upward into said first position.

4. The waste disposal pail as recited in claim 1, wherein said lid insert defines an opening allowing a waste item to pass therethrough before entering said waste liner, and said slider is disposed within said opening when said slider is in said first position.

5. The waste disposal pail as recited in claim 4, wherein lid insert has an interior wall and a detent coupled to said interior wall of the lid insert.

6. The waste disposal pail as recited in claim 5, wherein said slider has a dam, said dam makes abutting contact with said detent when said slider is in said second position to stop said slider from moving further downward in a vertical direction.

7. The waste disposal pail as recited in claim 6, wherein the slider has a cylindrical body.

8. The waste disposal pail as recited in claim 7, wherein and said bottom-most portion is a circular rim.

9. The waste disposal pail as recited in claim 8, wherein said circular rim has a bevel or chamfer surface attached thereto.

10. The waste disposal pail as recited in claim 9, wherein said slider has an upper rim, and said dam is coupled to the upper rim.

11. The waste disposal pail as recited in claim 6, wherein said slider has at least one support, and said bottom-most portion of the slider is a ring structure coupled to said at least one support.

12. The waste disposal pail as recited in claim 11, wherein said slider has an upper rim, and said at least one support is coupled to said upper rim.

13. The waste disposal pail as recited in claim 12, wherein said dam is coupled to said upper rim.

14. The waste disposal pail as recited in claim 6, wherein the slider is comprised of a plurality of downwardly extending panels each having a distal end, wherein said distal end defines said bottom-most portion of said slider.

15. The waste disposal pail as recited in claim 14, wherein said plurality of downwardly extending panels are coupled to an upper rim, and said dam is coupled to the upper rim.

16. The waste disposal pail as recited in claim 14, wherein said distal end of at least one of said plurality of downwardly extending panels has an arc shape.

17. The waste disposal pail as recited in claim 6, wherein the slider has an upper rim and a plurality of supports coupled to said upper rim, wherein each support forms an arc.

18. The waste disposal pail as recited in claim 17, wherein each one of said plurality of supports is a U-shaped metal wire.

* * * * *